United States Patent
Fujimoto et al.

(10) Patent No.: US 10,333,311 B2
(45) Date of Patent: Jun. 25, 2019

(54) ELECTRIC MOTOR CONTROL DEVICE

(71) Applicant: Mitsubishi Electric Corporation, Tokyo (JP)

(72) Inventors: Chiaki Fujimoto, Tokyo (JP); Kenta Tanaka, Tokyo (JP); Tatsuya Mori, Tokyo (JP); Isao Kezobo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/764,559

(22) PCT Filed: Jan. 14, 2016

(86) PCT No.: PCT/JP2016/050927
§ 371 (c)(1),
(2) Date: Mar. 29, 2018

(87) PCT Pub. No.: WO2017/122309
PCT Pub. Date: Jul. 20, 2017

(65) Prior Publication Data
US 2018/0323613 A1    Nov. 8, 2018

(51) Int. Cl.
*H02J 3/18* (2006.01)
*H02P 23/26* (2016.01)
*H02P 27/06* (2006.01)
*H02P 27/08* (2006.01)
(Continued)

(52) U.S. Cl.
CPC .......... *H02J 3/1892* (2013.01); *H02P 23/26* (2016.02); *H02P 27/06* (2013.01); *H02P 27/08* (2013.01);
(Continued)

(58) Field of Classification Search
CPC ...... H02P 1/00; H02P 1/04; H02P 1/46; H02P 1/24; H02P 3/00; H02P 3/18; H02P 27/04;
(Continued)

(56) References Cited

U.S. PATENT DOCUMENTS 5,677,611 A * 10/1997 Yoshihara ............. B60L 3/0023
                                                    318/139
8,963,468 B2 * 2/2015 Ito .......................... B62D 5/049
                                                    318/490
2013/0278198 A1    10/2013  Ito

FOREIGN PATENT DOCUMENTS

EP    2 662 973 A1    11/2013
JP    9-23501 A        1/1997
(Continued)

OTHER PUBLICATIONS

International Search Report for PCT/JP2016/050927 dated Apr. 12, 2016 [PCT/ISA/210].
(Continued)

*Primary Examiner* — Antony M Paul
(74) *Attorney, Agent, or Firm* — Sughrue Mion, PLLC; Richard C. Turner

(57) ABSTRACT

A control unit of an electric motor control device includes an inverter circuit 6 that supplies power to an electric motor, a current control unit that outputs a voltage command value as a drive command of the inverter circuit, a current detecting unit that detects current flowing to each phase of the electric motor, and a failed phase identifying unit that identifies a location of a failure in the current detecting unit. The failed phase identifying unit determines whether or not a magnitude or a phase of a frequency component of the test voltage command included in a detected current value when the inverter circuit is driven with a test voltage command having a frequency higher than a rotational frequency of the electric motor as a drive command is within a predetermined range, and determines that a failure has occurred in a phase that is not within the predetermined range.

14 Claims, 10 Drawing Sheets

(51) Int. Cl.
*H02P 29/024* (2016.01)
*H02P 29/028* (2016.01)

(52) U.S. Cl.
CPC .......... *H02P 29/024* (2013.01); *H02P 29/028* (2013.01)

(58) Field of Classification Search
CPC .... H02P 27/06; H02P 6/00; H02P 6/14; H02P 21/00; H02P 23/12; H02P 6/12; H02P 7/00; H02P 23/00; H02P 27/00; H02P 1/42; H02H 7/08; H02H 7/09; H02H 3/04; G01R 31/02
USPC .... 318/400.01, 400.02, 400.14, 400.15, 700, 318/701, 727, 799, 800, 801, 430, 807, 318/808, 809; 700/21, 143; 701/39, 43, 701/62, 92, 107
See application file for complete search history.

(56) References Cited

FOREIGN PATENT DOCUMENTS

| | | |
|---|---|---|
| JP | 2007-082313 A | 3/2007 |
| JP | 2007-330099 A | 12/2007 |

OTHER PUBLICATIONS

Extended European Search Report dated Dec. 17, 2018 issued by the European Patent Office in counterpart application No. 16884912.3.

Communication dated Feb. 19, 2019, from the Japanese Patent Office in counterpart application No. 2017-561452.

* cited by examiner

ELECTRIC MOTOR CONTROL DEVICE

CROSS REFERENCE TO RELATED APPLICATION

This application is a National Stage of International Application No. PCT/JP2016/050927filed Jan. 14, 2016.

TECHNICAL FIELD

The present invention relates to an electric motor control device, and in particular, relates to an electric motor control device that can detect a failure in a current detecting system.

BACKGROUND ART

With regard to an electric motor control device including a multiple of current detecting means, there is a demand to continue drive of an electric motor even when one portion of the current detecting means fails, and technology that identifies the failed current detecting means is needed in order to realize this demand. Also, when a failure location is known, maintenance such as replacement and repair becomes easier.

To date, as this kind of electric motor control device, there is an electric motor control device such that a failure diagnosis current command value is input into a current controller of the electric motor control device, and whether or not current detecting means has failed is determined from a voltage command value generated in the current controller, as disclosed in, for example, JP-A-2007-082313 (Patent Document 1).

CITATION LIST

Patent Literature

[Patent Document 1] JP-A-2007-082313

SUMMARY OF INVENTION

Technical Problem

The kind of example of an electric motor control device disclosed in Patent Document 1 is such that a failure diagnosis current command value is input into a current controller, and a failure is determined based on whether or not a voltage command value output from the current controller is greater than a voltage command value envisaged at a normal time. Because of this, it is necessary to stand by for a time longer than a response time determined based on a current control time constant, and wait for the voltage command value response to the current command value. Also, the technology disclosed in Patent Document 1 is such that a failure is determined based on the magnitude of the voltage command value, because of which there is a problem in that a phase in which current detecting means has failed cannot be determined.

Generally, a system having current detecting means in each of three phases is such that when the current detecting means in one phase fails, control can be continued by current of the failed phase being estimated from information from the normal current detecting means of the remaining two phases. However, the technology disclosed in Patent Document 1 is such that the phase of failed current detecting means cannot be determined, because of which a drive of an electric motor is stopped after a current detecting means failure is detected.

The invention, having been contrived with consideration to the problems of the previously described kind of existing device, has an object of providing an electric motor control device such that when a current detecting unit failure occurs in a system, a location of the current detecting unit failure can be identified quickly and accurately.

Solution to Problem

An electric motor control device according to the invention is an electric motor control device including a controller that controls a multi-phase winding electric motor, the control unit including an inverter circuit that supplies power to the electric motor, a current controller that outputs a voltage command value as a drive command of the inverter circuit, a current detector that detects current flowing to each phase of the electric motor, and a failed phase identifier that identifies a location of a failure in the current detector. The failed phase identifier has a test voltage command generator, which generates a test voltage command having a frequency higher than a rotational frequency of the electric motor, determines whether or not a magnitude or a phase of a frequency component of the test voltage command included in a detected current value when the inverter circuit is driven with the test voltage command as a drive command is within a predetermined range, and determines that a failure has occurred in a phase that is not within the predetermined range.

Advantageous Effects of Invention

According to the electric motor control device according to the invention, an inverter circuit is driven with a test voltage command as a drive command, and a signal of a test voltage frequency component included in a detected current value of each phase is compared with a threshold value, whereby a failed current detecting unit among three phases can be identified accurately, as a result of which a drive of an electric motor can be continued using detected values of current flowing to normal phases other than the failed phase. Also, in addition to this, a failure diagnosis signal is generated as a voltage command value, because of which a test voltage command frequency is determined without being limited by a response speed of a current control unit, and a failure can be diagnosed by directly measuring a response of current with respect to a failure diagnosis voltage command, without waiting for current control to respond, meaning that a location of a failure of the current detecting unit can be identified quickly.

DESCRIPTION OF EMBODIMENTS

Hereafter, preferred embodiments of an electric motor control device according to the invention will be described in detail, with reference to the drawings.

First Embodiment

Figure 1:
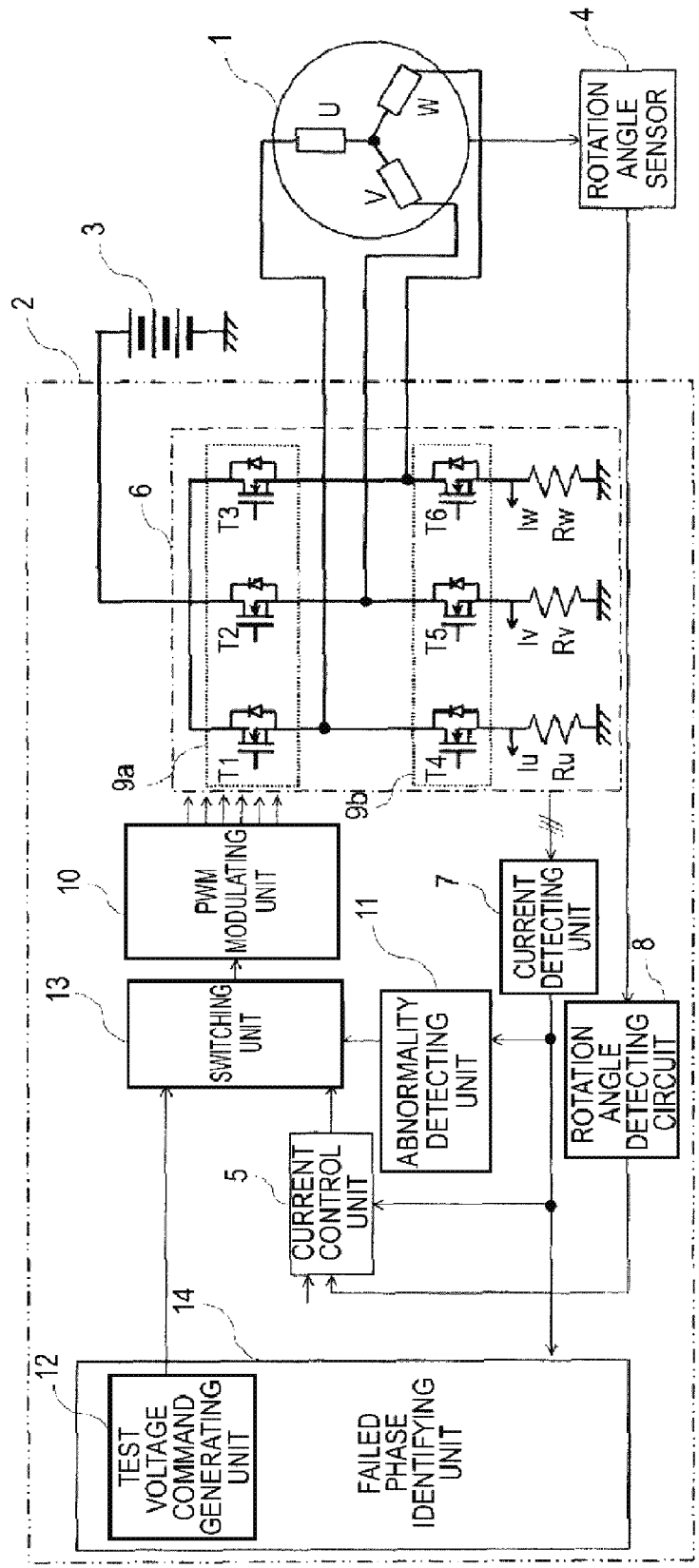
FIG. 1 is a circuit diagram showing an overall configuration of an electric motor control device according to a first embodiment of the invention.

FIG. 1 is a circuit diagram showing an overall configuration of an electric motor control device according to a first embodiment of the invention. In FIG. 1, the device is mainly configured of an electric motor 1, and a control unit 2 including, for example, a microcomputer or a portion configured of a memory and the like, and a battery 3 is disposed in an exterior of the control unit 2. Herein, the electric motor 1 is described as being a 3-phase (U, V, and W) brushless motor, but the electric motor 1 may also be a multi-phase winding motor of three phases or more. Also a rotation angle sensor 4 that detects an angle of rotation of the electric motor 1 is disposed in a vicinity of an output shaft of the electric motor 1. A current control unit 5 that generates a voltage command value for driving the electric motor 1, a so-called inverter circuit 6 that supplies power to the electric motor 1, a current detecting unit 7 that detects current being supplied to the electric motor 1, and a rotation angle detecting circuit 8 that detects information from the rotation angle sensor 4, are mounted in the control unit 2.

The current control unit 5 carries out feedback control in accordance with a current command value for realizing a rotation position and desired torque from the rotation angle detecting circuit 8 and an actual current value according to the current detecting unit 7, and computes a drive command as the voltage command value. Also, the feedback control includes determining a timing of supplying current to a 3-phase winding, that is, a timing of controlling the inverter circuit 6, in accordance with the rotation position from the rotation angle detecting circuit 8.

The inverter circuit 6 is such that, as shown in FIG. 1, a total of six switching elements T1, T2, T3, T4, T5, and T6 (referred to as the switching elements T1 to T6 in the following description) are disposed two each in series in upper and lower arms 9a and 9b in each of the three phases of windings U, V, and W, and shunt resistors Ru, Rv, and Rw are disposed one each in series positions in each phase of the lower arm 9b in order to detect current flowing to the electric motor 1. Upstream side terminals of the shunt resistors Ru, Rv, and Rw are each independently connected to the current detecting unit 7, and currents Iu, Iv, and Iw of each phase are detected. The current detecting unit 7 may be incorporated in the inverter circuit 6. Also, the switching elements T1 to T6 of the inverter circuit 6 are repeatedly driven on and off by switching signals generated by a drive command being modulated by a PWM modulating unit 10.

Furthermore, an abnormality detecting unit 11 configured of, for example, a microcomputer, or of a memory or the like, a test voltage command generating unit 12, a switching unit 13, and a failed phase identifying unit 14 are mounted in the control unit 2. Operations of the abnormality detecting unit 11, the test voltage command generating unit 12, the switching unit 13, and the failed phase identifying unit 14 will be described hereafter.

A method of detecting a failure in a current detecting unit system in the device configured as above will be described using FIG. 2. Herein, a failure in the current detecting unit system is based on the detected current values Iu, Iv, and Iw output by the current detecting unit 7, and also includes a failure of the shunt resistors Ru, Rv, and Rw or the current detecting unit 7, for example, a disconnection or an inability to output.

Figure 2:
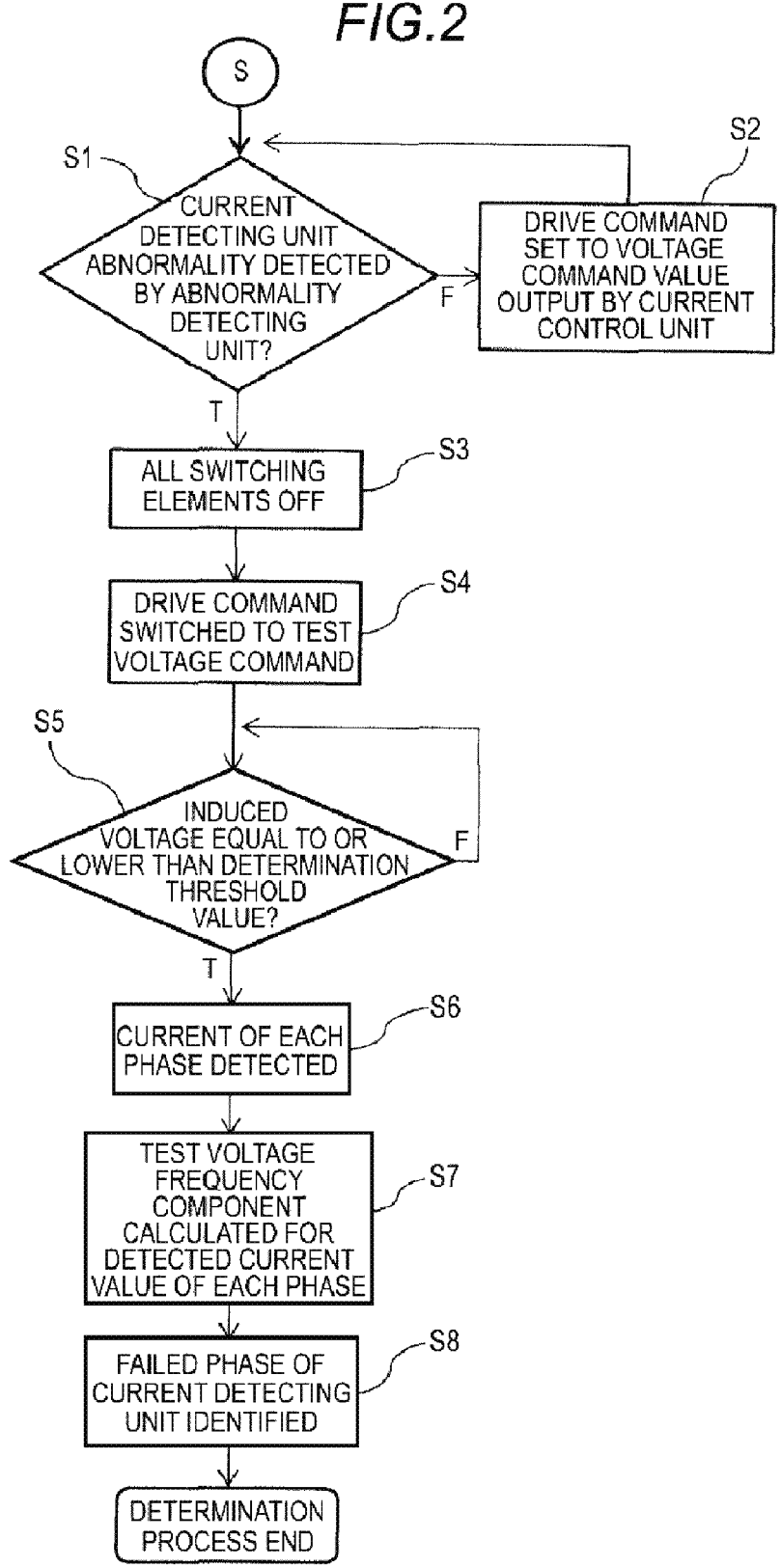
FIG. 2 is a flowchart describing an operation of a failed phase identifying unit of the electric motor control device according to the first embodiment of the invention.

FIG. 2 is a flowchart describing an operation of the failed phase identifying unit 14 of the electric motor control device according to the first embodiment.

In FIG. 2, firstly, an abnormality in the detected current value of each phase, or in the detected current values Iu, Iv, and Iw output by the current detecting unit 7 based on voltages of the switching elements T1 to T6 of the upper and lower arms 9a and 9b, is detected by the abnormality detecting unit 11 in step S1.

For example, when the output of the current detecting unit 7 at a timing at which the switching elements T1, T2, and T3 of the upper arm 9a in all phases are off and the switching elements T4, T5, and T6 of the lower arm 9b in all phases are off is greater than a threshold value at which the output is determined to be excessive, or when the output of the current detecting unit 7 at a timing at which the switching elements T1, T2, and T3 of the upper arm 9a in all phases are on and the switching elements T4, T5, and T6 of the lower arm 9b in all phases are off is greater than the threshold value, the abnormality detecting unit 11 determines that an abnormality has occurred in the switching elements T1 to T6 of the upper and lower arms 9a and 9b or in the current detecting unit 7. This phenomenon occurs when a failure such that the output of the current detecting unit 7 sticks at an upper limit value or a lower limit value occurs, or when a short circuit failure occurs, and one of the switching elements T1 to T6 of the upper and lower arms 9a and 9b is constantly in an on-state, regardless of the drive command.

Also, a short circuit failure of the switching elements T1 to T6 and a failure of the current detecting unit 7 cannot be distinguished between simply by abnormality detection using the detected current values, and there is a possibility of a failure of the current detecting unit 7 being erroneously identified. Because of this, the abnormality detecting unit 11 is such that a potential difference between a high potential side and a low potential side of each switching element T1 to T6 of the upper and lower arms 9a and 9b is detected, and when the potential difference is greater than an on-state voltage of the switching elements T1 to T6 with the drive command of the inverter circuit 6 in an on-state, it is determined that a failure has occurred in the switching elements T1 to T6. This phenomenon is caused by a short-circuit failure occurring in the switching elements T1 to T6, and a voltage drop occurring in the switching elements T1 to T6 due to a short-circuit current flowing at a timing at which the switching elements T1 to T6 of the upper and lower arms 9a and 9b are turned on simultaneously.

As heretofore described, the abnormality detecting unit 11 determines that there is an abnormality in the current detecting unit 7 only when determining that there is an abnormality by a determination using the detected current values and determining that there is no abnormality by a determination using the voltages of the switching elements T1 to T6, and the operation shifts to step S3.

In a state in which the abnormality detecting unit 11 does not detect an abnormality, the current detecting unit 7 determines that all phases are in a normal state, and the operation shifts to step S2, in which the inverter circuit 6 is driven with the voltage command value output by the current control unit 5 as the drive command of the electric motor 1.

In step S3, all of the switching elements T1 to T6 of the inverter circuit 6 are controlled to a predetermined stand-by time off-state. This is in order to cause the current flowing to the electric motor 1 to attenuate at a point at which an abnormality is detected by the abnormality detecting unit 11, and accurately detect a current flowing with respect to a test voltage command value to be described hereafter. In a state in which current of the upper limit value or the lower limit value that can be output by the current detecting unit 7 is flowing, the current is not accurately detected with respect to the test voltage command, because of which there is a possibility that the failed current detecting unit 7 cannot be identified. It is sufficient that a total of the current flowing to the electric motor 1 and the current flowing with respect to the test voltage command value is less than the upper limit value of the current detecting unit 7, or greater than the lower limit value, in a period for which all of the switching elements T1 to T6 are turned off. For example, a stand-by time is set to 50% of an electrical time constant of the electric motor 1.

Next, the operation shifts to step S4, in which the test voltage command is generated by the test voltage command generating unit 12, and the drive command of the inverter circuit 6 is switched by the switching unit 13 from the voltage command value output by the current control unit 5 to the test voltage command.

The current flowing to the electric motor 1 with respect to the test voltage command can be calculated from the test voltage command, electric motor winding impedance, and test voltage command frequency, using the following Expression (1). In Expression (1), Ra is a winding resistance value of the electric motor 1, La is inductance of the electric motor 1, ω is test voltage command angular frequency, and VH is test voltage command amplitude. Expression (1) is an expression by which a current IUH flowing to the U phase is calculated, but the V phase and the W phase can also be calculated in the same way. The test voltage command amplitude determines whether or not the current can be detected normally by the current detecting unit 7, because of which, for example, a test voltage amplitude at which the current flowing to the electric motor 1 is 10% of an inverter rated current is selected.

$$IUH = \frac{V_H}{\sqrt{R_a^2 + (\omega L_a)^2}} \quad (1)$$

Figure 3:
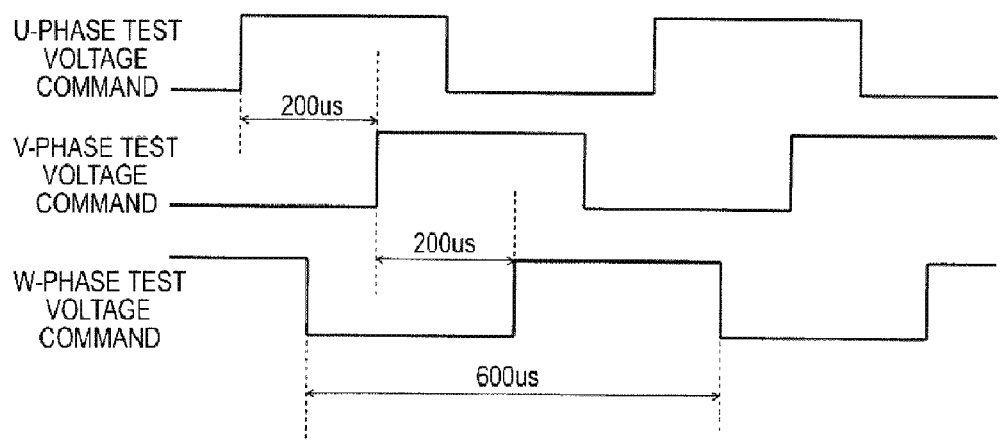
FIG. 3 is a diagram showing a case in which a test voltage command of the electric motor control device according to the first embodiment of the invention is a rectangular wave.

Also, the higher the test voltage command frequency, the shorter the time taken to identify the failed phase, but a maximum frequency of the test voltage command is limited by a computing cycle of the control unit 2. For example, when the computing cycle is 100μs, and the test voltage command is a 3-phase rectangular wave having a phase difference of 120 degrees between each phase shown in FIG. 3, the maximum frequency that can be realized is 1,666.67 Hz. Also, the test voltage command frequency needs to be higher than a rotational frequency of the electric motor 1, because of which a minimum frequency of the test voltage command needs to be of a value higher than a maximum rotational frequency of the electric motor 1. For example, in a case of an electric motor with a maximum rotational frequency of 200 Hz, the test voltage command is set to a frequency higher than 200 Hz.

Figure 4:
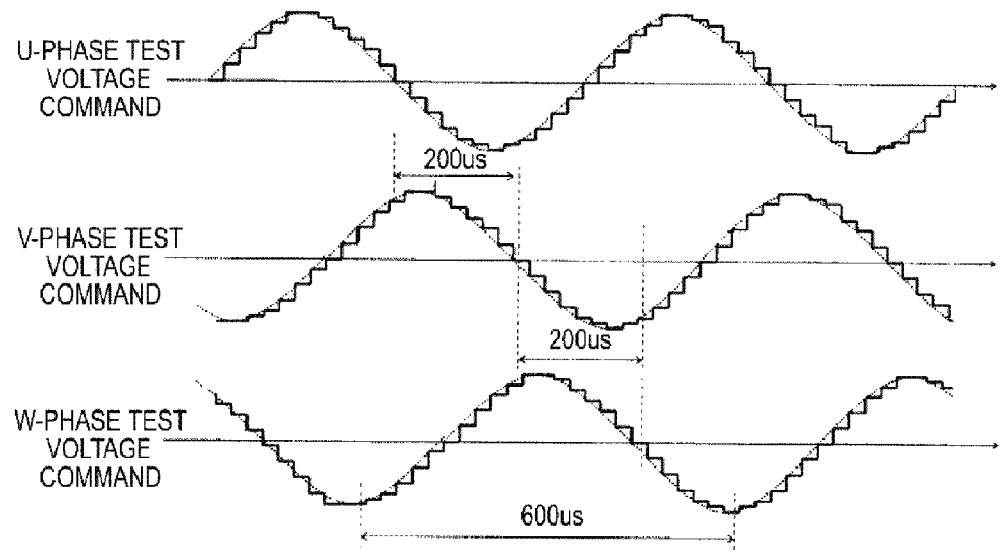
FIG. 4 is a diagram showing a case in which the test voltage command of the electric motor control device according to the first embodiment of the invention is a sinusoidal wave.

Also, the test voltage command waveform not being only rectangular, failed phase identification can also be carried out using the same procedure with a sinusoidal waveform, as shown in FIG. 4. FIG. 4 is an example of a sinusoidal wave generated with a computing cycle of 25 μs.

Returning to FIG. 2, after the drive command of the inverter circuit 6 is switched by the switching unit 13 to the test voltage command in step S4, the operation shifts to step S5, in which it is determined whether or not an induced voltage satisfies a determination condition. When the inverter circuit 6 is driven with the test voltage command as the drive command, three phases of terminal voltage of the inverter circuit 6 are of the same value when a test voltage command frequency component is removed, because of which current generated by the induced voltage of the electric motor 1 flows to the current detecting unit 7.

This current increases in proportion to induced voltage amplitude, because of which, depending on the state of the induced voltage, there is a possibility of the output of the current detecting unit 7 becoming a value greater than the upper limit value, or less than the lower limit value, and becoming saturated. When the output of the current detecting unit 7 is in a saturated state, the current flowing with respect to the test voltage command cannot be detected, because of which the determination of step S5 is such as to determine whether or not the state of the induced voltage satisfies a determination condition such that a sum of the current flowing due to the induced voltage and the current flowing with respect to the test voltage command is equal to or less than the upper limit value of the output of the current detecting unit 7, or equal to or greater than the lower limit value. Step S5 corresponds to induced current determination means.

As a method of determining whether or not the state of the induced voltage satisfies the determination condition, for example, there is a method that determines whether or not a rotational speed of the electric motor 1 is equal to or less than a threshold value. Also, when the output of the current detecting unit 7 is saturated, the three phases of detected current values cease to be in an equal state, because of which the state of the induced voltage may be determined based on whether or not a sum total of the detected current values of each phase is equal to or less than a threshold value corresponding to zero.

After determining in step S5 that the induced voltage is equal to or less than the determination threshold value, the operation shifts to a current detecting process of step S6 after a predetermined stand-by time elapses. The stand-by time is necessary in order to eliminate an effect of a delay in a response of current to voltage applied to the electric motor 1 owing to an electrical time constant of the electric motor windings, and the current detection of step S6 is started after standing by for the period of the electrical time constant of the electric motor 1 after the drive command is switched in step S4, whereby the current flowing to the electric motor 1 can be detected accurately.

Also, the configuration wherein the shunt resistors Ru, Rv, and Rw are disposed in series with the switching elements T4, T5, and T6 of the lower arm 9b, and the current flowing to each phase of the inverter circuit 6 is detected by the current detecting unit 7 connected to the upstream side of the shunt resistors Ru, Rv, and Rw, as in FIG. 1, is such that the output of the current detecting unit 7 at a timing at which the switching elements T1, T2, and T3 of the upper arm 9a are turned off and the switching elements T4, T5, and T6 of the lower arm 9b are turned on is acquired as a lower arm-on current, the output of the current detecting unit 7 at a timing at which the switching elements T1, T2, and T3 of the upper arm 9a are turned on and the switching elements T4, T5, and T6 of the lower arm 9b are turned off is acquired as a lower arm-off current, and these are utilized in the abnormality detecting process and the failed phase identifying process.

Next, a high frequency current, which is a frequency component of the test voltage command included in the detected current value, is computed in step S7.

A high frequency current when the inverter circuit 6 is driven with the test voltage command as the drive command is utilized in the failed phase identifying unit 14, because of which an operation extracting the frequency component of the test voltage command from the detected current value is necessary. As a method of extracting the frequency component of the test voltage command from the detected current value, there is a method that utilizes a notch filter. This method is such that a signal of the frequency component of the test voltage command is extracted by a signal obtained by passing the detected current value through a notch filter having an anti-resonance point in the frequency of the test voltage command being subtracted from the original detected current value. As the signal obtained using this method is an alternating current amount, an effective value is computed as in the following Expression (2), and compared with a threshold value. In Expression (2), the U-phase high frequency current is taken to be IUH, and T is a cycle of the test voltage command. Expression (2) is an expression relating to the U phase, but the V phase and the W phase can also be calculated in the same way.

$$|IUH| = \sqrt{\frac{2}{T}\int_0^T IUH^2 dt} \quad (2)$$

Also, the effective value of the high frequency current can also be obtained as the frequency component of the test voltage command using a Fourier analysis of the detected current value.

Next, a description will be given of the failed phase identifying process using the effective value of the high frequency current of each phase, shown in step S8.

In the failed phase identifying process, it is determined whether or not the effective value of the high frequency current of the test voltage frequency component extracted from the detected current of each phase is within a predetermined range, and the failed phase is identified. The predetermined range is the range between the maximum value and the minimum value of the high frequency current flowing to the electric motor windings with respect to the test voltage command calculated using Expression (1) and Expression (2), and is set with consideration to temperature characteristics of the winding impedance of the electric motor 1, manufacturing variation, and current detecting unit 7 measuring errors. For example, when a failure such that the output of the current detecting unit 7 in one of the three phases sticks at the upper limit value occurs, the effective value of the high frequency current of the failed phase is zero, which is outside the predetermined range. Because of this, it is determined that there is an abnormality, and as the effective values of the high frequency current of the remaining two normal phases are within the predetermined range, it can be determined that the current detecting unit 7 in the phase determined to be abnormal has failed.

Also, as it is determined in the failure identifying process whether or not the effective value of the high frequency current is within the predetermined range, a failure such that the output of the current detecting unit 7 sticks at a neutral value, or a failure such that an amplification rate of the output of the current detecting unit 7 with respect to an input signal is abnormal, can be determined accurately in addition to the failure such that the output of the current detecting unit 7 sticks at the upper limit value or the lower limit value.

Also, when it is determined by the failed phase identifying unit 14 that the current detecting unit 7 has failed in one of the three phases, the current of the failed phase is estimated from information on the current detecting unit 7 in the remaining two normal phases, and control can be continued.

Figure 5:
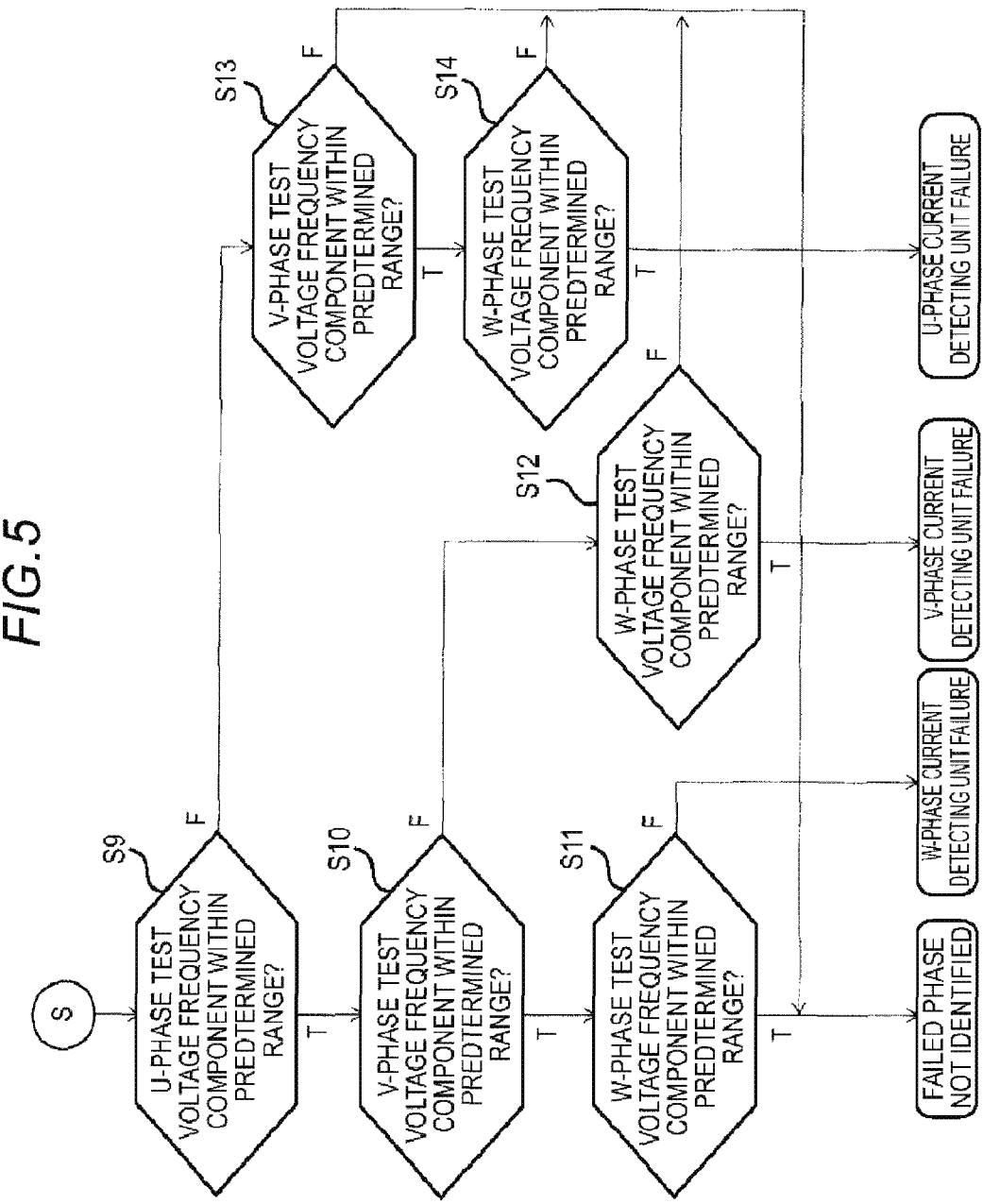
FIG. 5 is a flowchart of a failed phase identifying process of the electric motor control device according to the first embodiment of the invention.

FIG. 5 shows a flowchart of the failed phase identifying process. Firstly, in step S9, it is determined whether or not the effective value of the U-phase high frequency current is within the predetermined range. When the determination condition of step S9 is fulfilled, it is determined in step S10 whether or not the effective value of the V-phase high frequency current is within the predetermined range. When the determination condition of step S10 is also fulfilled, the operation shifts to step S11, and it is determined whether or not the effective value of the W-phase high frequency current is within the predetermined range. When the condition of step S11 is not fulfilled, it is determined that only the W phase of the three phases is abnormal, because of which it is determined that the current detecting unit 7 in the W phase has failed, and the failed phase identifying process is ended.

Also, when the determination condition of step S10 is not fulfilled, the operation shifts to step S12, and it is determined whether or not the effective value of the W-phase high frequency current is within the predetermined range. When the determination condition of step S12 is fulfilled, it is determined that only the V phase of the three phases is abnormal, because of which it is determined that the current detecting unit 7 in the V phase has failed, and the failed phase identifying process is ended.

Also, when the determination condition of step S9 is not fulfilled, it is determined in step S13 whether or not the effective value of the V-phase high frequency current is within the predetermined range, and when the determination condition of step S13 is fulfilled, the operation shifts to step S14. In step S14, it is determined whether or not the effective value of the W-phase high frequency current is within the predetermined range, and when the determination condition is fulfilled, it is determined that only the U phase of the three phases is abnormal, because of which it is determined that the current detecting unit 7 in the U phase has failed, and the failed phase identifying process is ended.

When the determination condition of step S11 is fulfilled, it is determined that all three phases are normal, because of which it is determined that no failed phase is identified. Also, when the determination condition of any one of step S12, step S13, or step S14 is not fulfilled, it is determined that the current detecting unit 7 has failed in two or more phases, because of which it is determined that no failed phase is identified.

As previously described, the electric motor control device according to the first embodiment is an electric motor control device including the multi-phase winding electric motor 1 and the control unit 2 for controlling the electric motor 1, and the control unit 2 includes the inverter circuit 6 that supplies power to the electric motor 1, the current control unit 5 that outputs a voltage command value as a drive command of the inverter circuit 6, the current detecting unit 7 that detects current flowing to each phase of the electric motor 1, and the failed phase identifying unit 14 that identifies a location of a failure in the current detecting unit 7. The failed phase identifying unit 14 is configured so as to have the test voltage command generating unit 12, which generates a test voltage command having a frequency higher than the rotational frequency of the electric motor 1, determine whether or not the magnitude or the phase of a frequency component of the test voltage command included in a detected current value when the inverter circuit 6 is driven with the test voltage command as a drive command is within a predetermined range, and determine that a failure has occurred in a phase that is not within the predetermined range, because of which a heretofore non-existing advantage is obtained in that the location of a failure in the current detecting unit 7 can be identified accurately.

Also, the control unit 2 includes the abnormality detecting unit 11 that detects that an abnormality has occurred in the electric motor 1, the inverter circuit 6, or the current detecting unit 7, drives the inverter circuit 6 with the voltage command output from the current control unit 5 as the drive command when the abnormality detecting unit 11 is not detecting an abnormality, and drives the inverter circuit 6 with the test voltage command generated by the test voltage command generating unit 12 as the drive command when the abnormality detecting unit 11 detects an abnormality, and the failed phase identifying unit 14 is configured so as to start an identification of a failed phase when the abnormality detecting unit 11 detects an abnormality, because of which a current control feedback loop takes on an interrupted state, and a failure can be diagnosed by directly measuring a response from the test voltage command to the detected current value. Because of this, a heretofore non-existing advantage is obtained in that a failed phase can be quickly identified using the high frequency test voltage command, without being limited by a response time of feedback control by the current control unit 5.

Furthermore, as the inverter circuit 6 is driven with the test voltage command as the drive command only when the current control unit 5 has failed, the failed phase identifying unit 14 does not affect the drive of the electric motor 1 when the current detecting unit 7 is in a normal state, so the electric motor 1 can be controlled smoothly when the current detecting unit 7 is in a normal state.

Also, the failed phase identifying unit 14 includes the induced current determination means that determines whether or not current flowing due to the induced voltage of the electric motor 1 is equal to or less than a threshold value, and determines that a failure of the current detecting unit 7 has occurred when determining that the current flowing due to the induced voltage is equal to or less than the threshold value. Because of this, a state wherein the current with respect to the test voltage cannot be detected accurately due to the output of the current detecting unit 7 being saturated because of induced current is avoided, and the failed phase of the current detecting unit 7 can be identified accurately.

Also, the induced current determination means is configured so as to determine whether or not the current flowing due to the induced voltage of the electric motor 1 is equal to or less than the threshold value based on the rotational speed of the electric motor 1, because of which a state wherein the induced voltage increases and there is a possibility of a failure of the inverter circuit 6 or a failure of the current detecting unit 7 being erroneously determined can be distinguished using the rotational speed, meaning that the system configuration can be simplified.

Also, the inverter circuit 6 includes the switching elements T1 to T6 in the upper and lower arms 9a and 9b corresponding to each phase of the electric motor 1, and includes the current detecting unit 7 in series with the switching elements T4, T5, and T6 of the lower arm 9b in each phase, and the failed phase identifying unit 14 is configured so as to compute the magnitude or the phase of the frequency component of the test voltage command based on the current of each phase detected when all of the switching elements T4, T5, and T6 of the lower arm 9b are in an on-state, because of which a heretofore non-existing advantage is obtained in that a failure such that the output of the current detecting unit 7 sticks at the neutral value, or a failure such that the amplification rate of the output of the current detecting unit 7 with respect to an input signal is abnormal, can be distinguished in addition to the failure such that the output of the current detecting unit 7 sticks at the upper limit value or the lower limit value.

Also, a short-circuit current flowing to the inverter circuit 6 when a short-circuit failure of the switching elements T1, T2, and T3 of the upper arm 9a occurs can be detected from the current of each phase detected when all of the switching elements T4, T5, and T6 of the lower arm 9b are in an on-state, because of which a failure of the inverter circuit 6 can be detected from the detected current value.

Furthermore, the failed phase identifying unit 14 is configured so as to distinguish between a failure of the switching elements T1 to T6 and a failure of the current detecting unit 7 based on the current of each phase detected when all of the switching elements T4, T5, and T6 of the lower arm 9b are in an off-state, because of which the failed phase identifying unit 14 can accurately distinguish between the failure such that the output of the current detecting unit 7 sticks at the neutral value and a failure of the switching elements T1 to T6, which is difficult from only the current of each phase detected when all of the switching elements T4, T5, and T6 of the lower arm 9b are in an on-state.

Second Embodiment

Next, the electric motor control device according to a second embodiment of the invention will be described. The second embodiment is such that there is a change to the process shown in step S4 in FIG. 2, described in the first embodiment, of switching the drive command when the abnormality detecting unit 11 detects an abnormality.

In the first embodiment, a description is given of a method such that when the abnormality detecting unit 11 detects an abnormality of the current detecting unit 7, the drive command of the inverter circuit 6 is switched by the switching unit 13 to the test voltage command. The second embodiment is such that when the abnormality detecting unit 11 detects an abnormality, the drive command of the inverter circuit 6 is generated by the test voltage command value being added to the voltage command value output by the current control unit 5. When the test voltage command value is added to the voltage command value output by the current control unit 5, as in the second embodiment, a current greater than the upper limit value or the lower limit value of the output of the current detecting unit 7 flows, and there is a possibility that the high frequency current cannot be detected accurately. Therefore, upper limit value and lower limit value restrictions are set for the voltage command value output by the current control unit 5 at a point at which the abnormality detecting unit 11 detects an abnormality, and the inverter circuit 6 is driven by a drive command such that the current flowing to the electric motor 1 does not reach the upper limit value or the lower limit value of the output of the current detecting unit 7 when the test voltage command value is added.

As previously described, the control unit 2 of the second embodiment is configured so as to include the abnormality detecting unit 11 that detects that an abnormality has occurred in the electric motor 1, the inverter circuit 6, or the current detecting unit 7, drive the inverter circuit 6 with the voltage command output from the current control unit 5 as the drive command when the abnormality detecting unit 11 is not detecting an abnormality, and drive the inverter circuit 6 with a value that is the test voltage command added to the voltage command output from the current control unit 5 as the drive command when the abnormality detecting unit 11 detects an abnormality, because of which fluctuation of the drive command when shifting to the failed phase identifying process after the abnormality detecting unit 11 detects an abnormality decreases in comparison with that in the first embodiment, and a heretofore non-existing advantage is obtained in that output fluctuation of the electric motor 1 occurring due to the failed phase identifying process can be restricted.

Also, the failed phase identifying unit 14 is configured so as to have the test voltage command generating unit 12, which generates a test voltage command having a frequency higher than the rotational frequency of the electric motor 1, and in the same way as in the first embodiment, determine whether or not the magnitude or the phase of a frequency component of the test voltage command included in a detected current value when the inverter circuit 6 is driven is within a predetermined range, and determine that a failure has occurred in a phase that is not within the predetermined range, because of which the failed current detecting unit 7 can be identified accurately.

Third Embodiment

Next, the electric motor control device according to a third embodiment of the invention will be described. The third embodiment is such that there is a change to the process shown in step S7 in FIG. 2, described in the first embodiment, of extracting the frequency component of the test voltage from the detected current value of each phase. In the first embodiment, the failed phase is identified by comparing the magnitude of the frequency component of the test voltage extracted from the detected current value of each phase with the threshold value, but the failed phase can also be identified using high frequency current phase information, as in the third embodiment.

As a method of extracting high frequency current phase information, for example, there is a method such that the high frequency current is multiplied by each of a sine wave and a cosine wave generated from a phase of the test voltage command, one cycle's worth of each of a signal from multiplying by the sine wave and a signal from multiplying by the cosine wave is integrated, and phase information is obtained based on a ratio of the integrated values. When a failure occurs in the current detecting unit 7, the high frequency current flowing with respect to the test voltage does not appear in the output of the current detecting unit 7, because of which the phase difference between the test voltage and the high frequency current increases compared with a case in which the current detecting unit 7 is normal. Consequently, by determining whether or not phase difference information computed from the high frequency current coincides with the phase difference when the current detecting unit 7 is normal, it can be determined that the current detecting unit 7 has failed in a phase that does not coincide with the phase difference at a normal time.

As previously described, the failed phase identifying unit 14 of the third embodiment is configured so as to have the test voltage command generating unit 12, which generates a test voltage command having a frequency higher than the rotational frequency of the electric motor 1, determine whether or not the phase of a frequency component of the test voltage command included in the detected current value when the inverter circuit 6 is driven with the test voltage command as the drive command is within a predetermined range, and determine that a failure has occurred in a phase that is not within the predetermined range, because of which a heretofore non-existing advantage is obtained in that the failed current detecting unit 7 can be identified accurately. Also, even when configuring as in the third embodiment, the only differences from the first embodiment are the high frequency current signal processing of step S7 of FIG. 2 and the current detecting unit 7 failed phase identifying process threshold value setting of step S8 of FIG. 2, and exactly the same other steps S1 to S6, and the failed phase identifying process of S8, can be utilized. Consequently, the same advantages as in the first embodiment are obtained.

Fourth Embodiment

Next, the electric motor control device according to a fourth embodiment of the invention will be described. In the first embodiment, detection by the abnormality detecting unit 11 is not carried out after the abnormality detecting unit 11 detects an abnormality and the operation shifts to the failed phase identifying process, but in the fourth embodiment, abnormality detection by the abnormality detecting unit 11 is also continued in a period for which the inverter circuit 6 is driven by the test voltage command.

Figure 6:
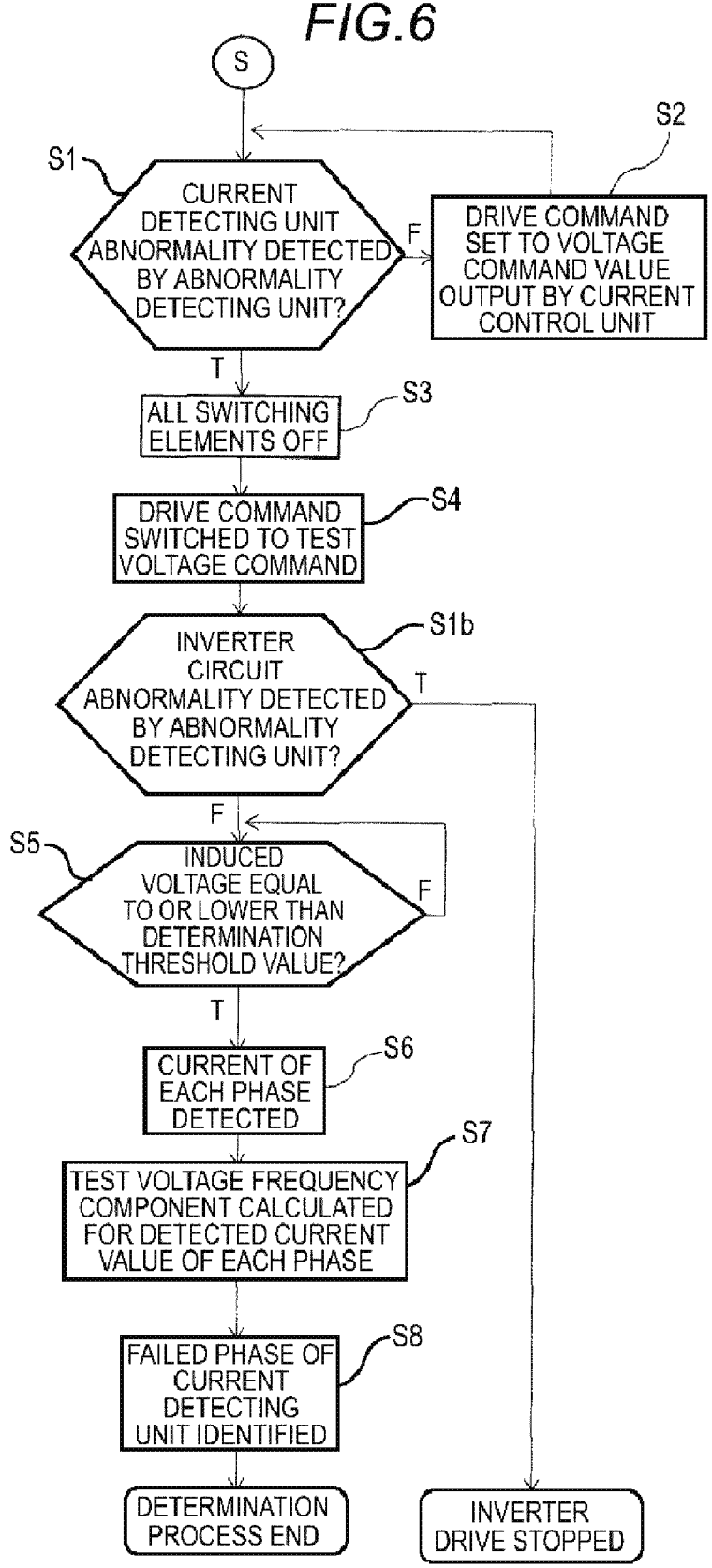
FIG. 6 is a flowchart of the failed phase identifying process of the electric motor control device according to a fourth embodiment of the invention.

The first embodiment is such that when a failure of the inverter circuit 6 occurs in a period for which the inverter circuit 6 is driven by the test voltage command, no abnormality is detected by the abnormality detecting unit 11, because of which, for example, the switching elements T1 to T6 of the upper and lower arms 9a and 9b are simultaneously turned on when a short-circuit failure of the switching elements T1 to T6 occurs, because of which a current equal to or greater than the rated current flows to the inverter circuit 6, and there is a possibility of the inverter circuit 6 being broken. Therefore, as shown in step S1b of FIG. 6, abnormality detection by the abnormality detecting unit 11 is also carried out in a period for which the inverter circuit 6 is driven by the test voltage command, and the drive of the inverter circuit 6 is stopped at a point at which the abnormality detecting unit 11 detects an abnormality, thereby preventing breakage of the inverter circuit 6 and the electric motor 1.

Of the aspects of the abnormality detecting unit 11 described in the first embodiment, the abnormality detecting method whereby the potential difference between the high potential side and the low potential side of each switching element T1 to T6 of the upper and lower arms 9a and 9b is detected, and when the potential difference is greater than the on-state voltage of the switching elements T1 to T6 with the drive command of the inverter circuit 6 in an on-state, it is determined that a failure has occurred in the switching elements T1 to T6, is applied in step S1b.

As previously described, the control unit 2 of the fourth embodiment is configured so as to include the abnormality detecting unit 11 that detects that an abnormality has occurred in the electric motor 1, the inverter circuit 6, or the current detecting unit 7, drive the inverter circuit 6 with the voltage command output from the current control unit 5 as the drive command when the abnormality detecting unit 11 is not detecting an abnormality, drive the inverter circuit 6 with the test voltage command generated by the test voltage command generating unit 12 as the drive command when the abnormality detecting unit 11 detects an abnormality, and the failed phase identifying unit 14 stars an identification of a failed phase when the abnormality detecting unit 11 detects an abnormality, because of which a shift can be made to the current detecting unit 7 failed phase identifying process with no erroneous determination of a failure of the inverter circuit 6 or a failure of the current detecting unit 7.

Furthermore, by abnormality detection also being carried out during the failed phase identifying process as in the fourth embodiment, a failure of the inverter circuit 6 occurring in a period for which the inverter circuit 6 is driven with the test voltage command as the drive command can be detected, because of which a heretofore non-existing advantage is obtained in that the drive of the inverter circuit 6 can be stopped without breaking the electric motor control device when a failure of the inverter circuit 6 occurs during the failed phase identifying process.

Fifth Embodiment

Next, the electric motor control device according to a fifth embodiment of the invention will be described. The fifth embodiment is such that there is a change to the process described in the fourth embodiment of detecting an abnormality in a period for which the inverter circuit 6 is driven by the test voltage command. In the fifth embodiment, the sum total of the detected current values of each phase when the inverter circuit 6 is driven by the test voltage command is obtained, and a failure of the inverter circuit 6 is determined.

Figure 7:
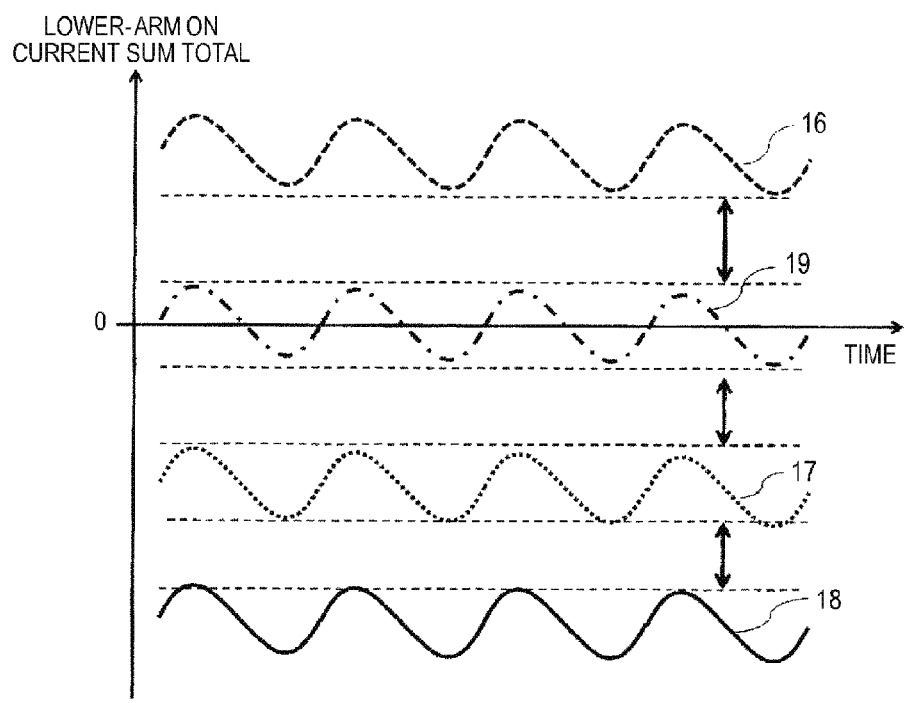
FIG. 7 is a diagram showing an example of current waveforms when a failure occurs in the electric motor control device according to a fifth embodiment of the invention.
Figure 8:
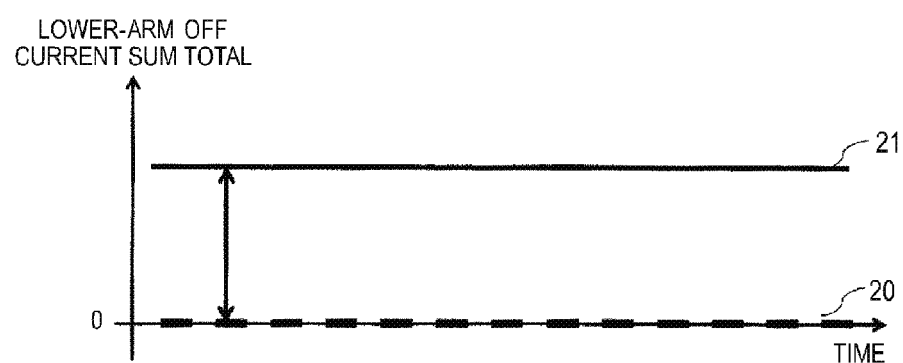
FIG. 8 is a diagram showing an example of current waveforms when a failure occurs in the electric motor control device according to the fifth embodiment of the invention.

Details of the fifth embodiment will be described based on FIG. 7 and FIG. 8. When a short-circuit failure occurs in the switching elements T1, T2, and T3 of the upper arm 9a in a state wherein the inverter circuit 6 is being driven by the test voltage command, the output terminal of the inverter circuit 6 in this phase is constantly connected to the high potential side of the battery 3, because of which the output voltage of the inverter circuit 6 in the failed phase of the switching elements T1, T2, and T3 increases in comparison with that in the remaining two normal phases. This means that when a short-circuit failure occurs in the switching elements T1, T2, and T3, the lower-arm on current of the failed phase sticks on the lower output limit value of the current detecting unit 7, and the lower-arm on current of the two normal phases is biased to the negative side.

Meanwhile, in the case of a failure such that the output of the current detecting unit 7 sticks at the upper limit value, the lower limit value, or the neutral value, the differences among the output voltages in the various phases of the inverter circuit 6 are small, because of which no bias appears in the lower-arm on current of the two normal phases. Because of this, a sum total 16 of the lower-arm on currents of each phase when a failure such that the output of the current detecting unit 7 sticks at the upper limit value occurs, and a sum total 17 of the lower-arm on currents of each phase when a failure such that the output of the current detecting unit 7 sticks at the lower limit value occurs, are large in comparison with a sum total 18 of the lower-arm on currents of each phase when a short-circuit failure occurs in the switching elements T1, T2, and T3 of the upper arm 9a in one of the three phases. Consequently, when the sum total of the lower-arm on currents of each phase is equal to or lower than a threshold value at which it is determined that a short-circuit failure has occurred in the switching elements T1, T2, and T3 of the upper arm 9a, it can be determined that a short-circuit failure has occurred in the switching elements T1, T2, and T3.

Also, when a short-circuit failure occurs in the switching elements T4, T5, and T6 of the lower arm 9b, a difference appearing among the output voltages of the inverter circuit 6 in the failed phase and the remaining two normal phases is small, because of which an absolute value of a sum total 19 of the lower-arm on currents of each phase is small in comparison with an absolute value of a value that is the sum total of the lower-arm on currents of each phase when a failure such that the output of the current detecting unit 7 sticks at the upper limit value or the lower limit value occurs. Consequently, when the absolute value of the value that is the sum total of the lower-arm on currents of each phase is equal to or lower than a threshold value at which it is determined that a short-circuit failure has occurred in the switching elements T4, T5, and T6 of the lower arm 9b, it is determined that a short-circuit failure has occurred in the switching elements T4, T5, and T6.

Meanwhile, in the case of a failure such that the output of the current detecting unit 7 sticks at the neutral value, the sum total of the lower-arm on currents of each phase approximately coincides with a case in which a short-circuit failure occurs in the switching elements T4, T5, and T6 of the lower arm 9b, because of which a short-circuit failure in the switching elements T4, T5, and T6 of the lower arm 9b and a failure such that the output of the current detecting unit 7 sticks at the neutral value cannot be distinguished between using the sum total of the lower-arm on currents of each phase. Because of this, a short-circuit failure in the switching elements T4, T5, and T6 of the lower arm 9b and a failure such that the output of the current detecting unit 7 sticks at the neutral value are distinguished between utilizing the sum total of the lower-arm off currents of each phase.

In the case of a failure such that the output of the current detecting unit 7 sticks at the neutral value, no current flows to the shunt resistors Ru, Rv, and Rw at a timing at which the lower-arm off current is detected, because of which a sum total 20 of the lower-arm off currents of each phase is zero amps, corresponding to the neutral value of the output of the current detecting unit 7. Meanwhile, when a short-circuit failure occurs in the switching elements T4, T5, and T6 of the lower arm 9b, the switching elements T1 to T6 of the upper and lower arms 9a and 9b are turned on at a timing at which the lower-arm off current is detected, and a flow-through current flows, because of which a sum total 21 of the lower-arm off currents of each phase is greater than zero amps. Consequently, the sum total of the lower-arm off currents of each phase is obtained, and when the sum total is equal to or greater than a threshold value at which it is determined that a short-circuit failure has occurred in the switching elements T4, T5, and T6 of the lower arm 9b, it is determined that a short-circuit failure has occurred in the switching elements T4, T5, and T6.

Figure 9:
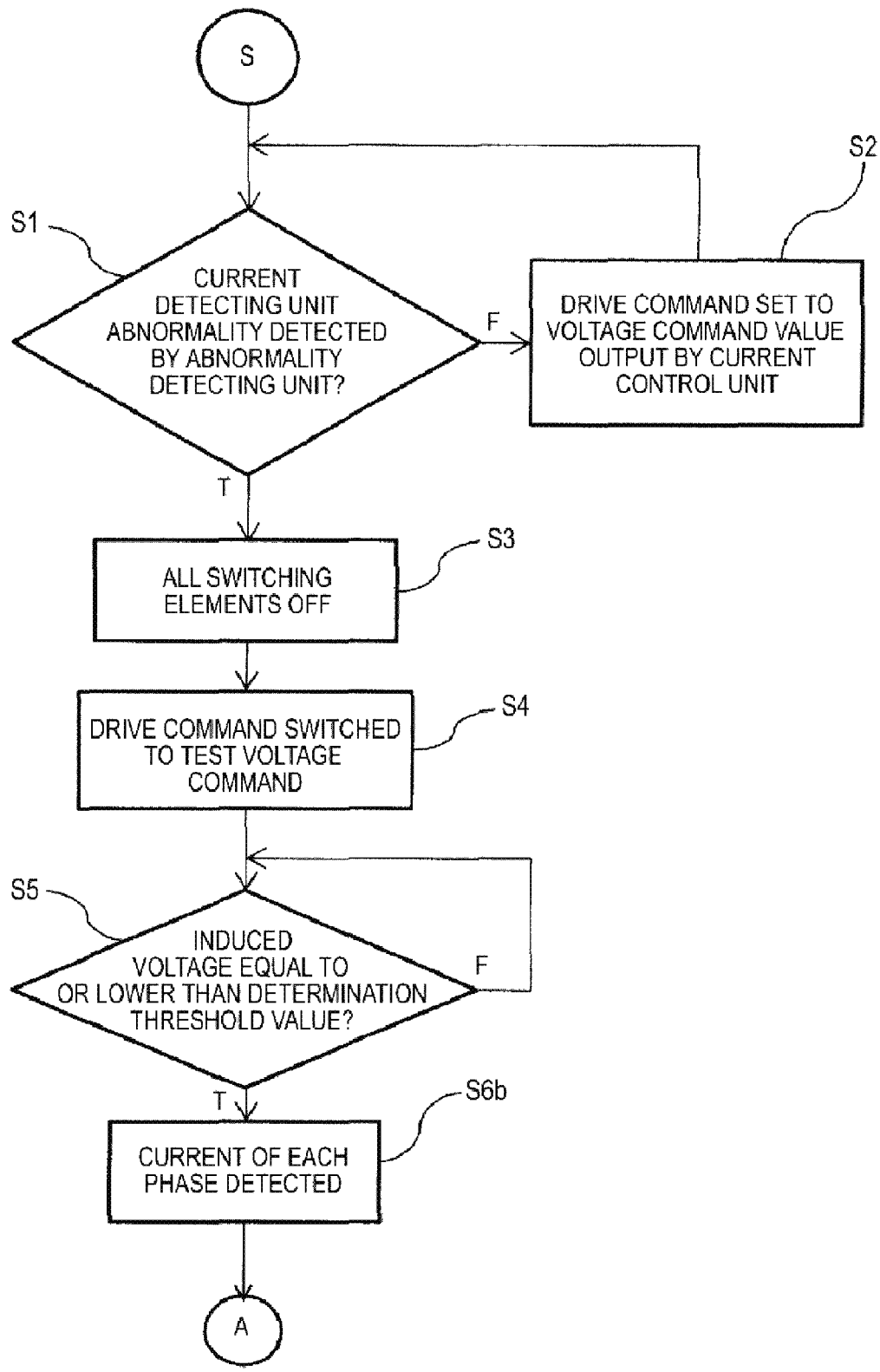
FIG. 9 is a flowchart of the failed phase identifying process of the electric motor control device according to the fifth embodiment of the invention.
Figure 10:
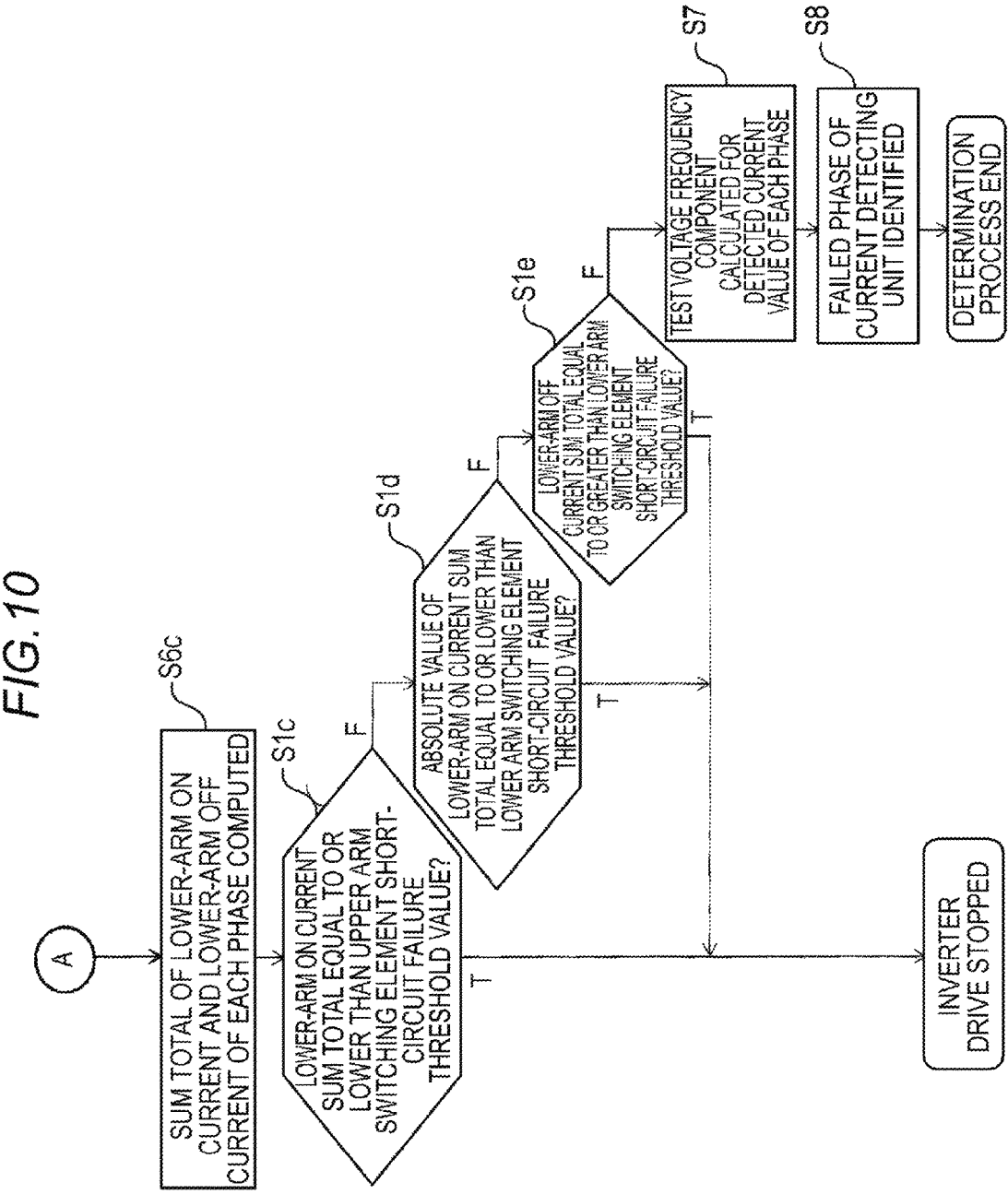
FIG. 10 is a flowchart of the failed phase identifying process of the electric motor control device according to the fifth embodiment of the invention.

A flowchart of the abnormality detecting process shown in the fifth embodiment is shown in FIG. 9 and from step S1c onward in FIG. 10. Firstly, in step S6b, the lower-arm on current and the lower-arm off current of each phase are detected in step S6b, and sum totals of the lower-arm on currents and the lower-arm off currents of each phase are computed in step S6c.

Next, when the sum total of the lower-arm on currents is equal to or less than the threshold value at which it is determined that a short-circuit failure has occurred in the switching elements T1, T2, and T3 of the upper arm 9a in step S1c, it is determined that a short-circuit failure has occurred in the switching elements T1, T2, and T3, and the drive of the inverter circuit 6 is stopped. When the determination condition of step S1c is not fulfilled, the operation shifts to step S1d.

When the absolute value of the sum total of the lower-arm on currents is equal to or less than the threshold value at which it is determined that a short-circuit failure has occurred in the switching elements T4, T5, and T6 of the lower arm 9b in step S1d, it is determined that a short-circuit failure has occurred in the switching elements T4, T5, and T6, and the drive of the inverter circuit 6 is stopped. When the determination condition of step S1d is not fulfilled, the operation shifts to step S1e.

When the sum total of the lower-arm off currents is equal to or less than the threshold value at which it is determined that a short-circuit failure has occurred in the switching elements T4, T5, and T6 of the lower arm 9b in step S1e, it is determined that a short-circuit failure has occurred in the switching elements T4, T5, and T6, and the drive of the inverter circuit 6 is stopped. When the determination condition of step S1e is not fulfilled, it is determined that no failure has occurred in the switching elements T1 to T6 of the upper and lower arms 9a and 9b, the operation shifts to step S7, and the current detecting unit 7 failed phase identifying process is started.

The abnormality detection utilizing the sum total of detected current values shown in the fifth embodiment is such that when current flowing due to the induced voltage of the electric motor 1 increases, there is a possibility of a failure of the switching elements T1 to T6 or a failure of the current detecting unit 7 being erroneously determined. Because of this, the fifth embodiment is such that it is determined whether or not current flowing due to the induced voltage of the electric motor 1 is equal to or less than the threshold value, and the operation shifts to the process of step S1c onward only when the current is equal to or less than the threshold value.

As previously described, the failed phase identifying unit 14 of the fifth embodiment is configured so as to compute the sum total of the detected current values of each phase, determine whether or not the sum total is smaller than the threshold value, and determine that a failure has occurred in the current detecting unit 7 when the absolute value of the sum of the detected current values of the three phases is smaller than the threshold value, because of which a heretofore non-existing advantage is obtained in that a failure of the inverter circuit 6 and a failure of the current detecting unit 7 can be distinguished between.

Also, the failed phase identifying unit 14 is configured so as to include the induced current determination means that determines whether or not current flowing due to the induced voltage of the electric motor 1 is equal to or less than the threshold value, and determines that a failure has occurred in the current detecting unit 7 when determining that the current flowing due to the induced voltage is equal to or less than the threshold value, because of which a state wherein a failure of the inverter circuit 6 or a failure of the current detecting unit 7 is erroneously determined due to the induced current is avoided, and a heretofore non-existing advantage is obtained in that a failure of the current detecting unit 7 can be distinguished accurately.

Furthermore, by abnormality detection also being carried out during the failed phase identifying process as in the fifth embodiment, a failure of the inverter circuit 6 occurring in a period for which the inverter circuit 6 is driven with the test voltage command as the drive command can be detected, because of which the drive of the inverter circuit 6 can be stopped without breaking the electric motor control device when a failure of the inverter circuit 6 occurs during the failed phase identifying process.

Also, the induced current determination means is configured so as to determine whether or not the current flowing due to the induced voltage of the electric motor 1 is equal to or less than the threshold value based on the rotational speed of the electric motor 1, because of which a state wherein the induced voltage increases and there is a possibility of a failure of the inverter circuit 6 or a failure of the current detecting unit 7 being erroneously determined can be distinguished using the rotational speed, meaning that the system configuration can be simplified.

Also, the inverter circuit 6 includes the switching elements T1 to T6 in the upper and lower arms 9a and 9b corresponding to each phase of the electric motor 1, and includes the current detecting unit 7 in series with the switching elements T4, T5, and T6 of the lower arm 9b in each phase, and the failed phase identifying unit 14 is configured so as to compute the sum total of the currents of each phase detected when all of the switching elements T4, T5, and T6 of the lower arm 9b are in an on-state, because of which a heretofore non-existing advantage is obtained in that a failure of the inverter circuit 6 and a failure of the current detecting unit 7 can be distinguished between, which is difficult from only the detected current value of each phase.

Also, the inverter circuit 6 includes the switching elements T1 to T6 in the upper and lower arms 9a and 9b corresponding to each phase of the electric motor 1, and includes the current detecting unit 7 in series with the switching elements T4, T5, and T6 of the lower arm 9b in each phase, and the failed phase identifying unit 14 is configured so as to compute the sum total of the currents of each phase detected when all of the switching elements T4, T5, and T6 of the lower arm 9b are in an off-state, because of which a heretofore non-existing advantage is obtained in that a short-circuit failure of the switching elements T4, T5, and T6 of the lower arm 9b and the failure such that the current detecting unit 7 sticks at the neutral value can be distinguished between.

Sixth Embodiment

Figure 11:
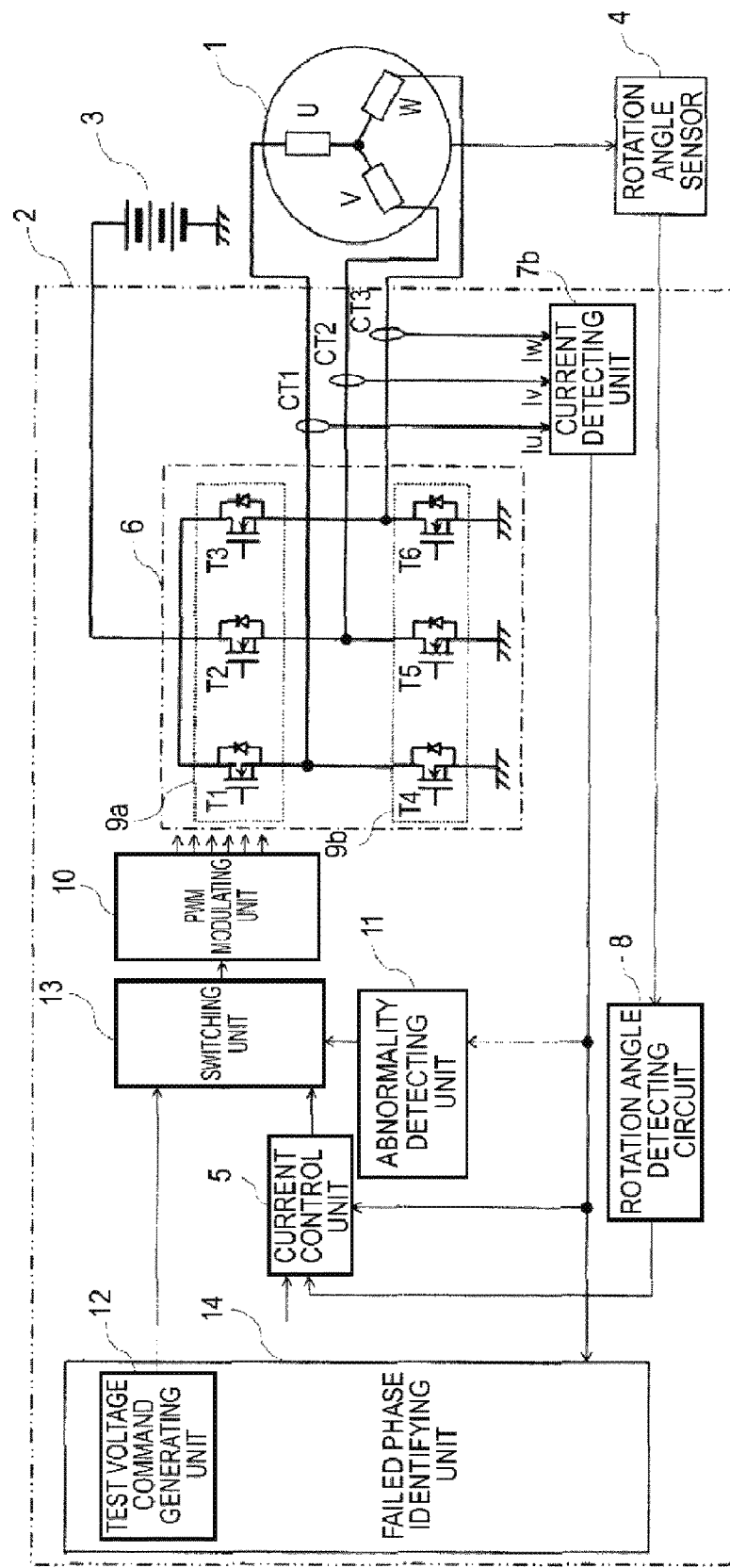
FIG. 11 is a circuit diagram showing an overall configuration of the electric motor control device according to a sixth embodiment of the invention.

Next, the electric motor control device according to a sixth embodiment of the invention will be described. In the first embodiment, a description is given with the current detecting unit 7 that uses the shunt resistors Ru, Rv, and Rw disposed in series with the switching elements T4, T5, and T6 of the lower arm 9b as an example, but in the sixth embodiment, a current detecting unit 7b (CT1, CT2, and CT3) is disposed in each phase of power lines connecting the inverter circuit 6 and the electric motor 1, as shown in FIG. 11. Other configurations are the same as in the first embodiment.

In the first embodiment, the output of the current detecting unit 7 is acquired at a timing at which the switching elements T1, T2, and T3 of the upper arm 9a are turned off and the switching elements T4, T5, and T6 of the lower arm 9b are turned on, but in the sixth embodiment, the current detecting unit 7b can constantly detect current flowing to the electric motor 1, regardless of the state of the switching elements T1 to T6 of the upper and lower arms 9a and 9b.

As previously described, the failed phase identifying unit 14 of the sixth embodiment is configured so as to have the test voltage command generating unit 12, which generates a test voltage command having a frequency higher than the rotational frequency of the electric motor 1, determine whether or not the magnitude or the phase of a frequency component of the test voltage command included in the detected current value when the inverter circuit 6 is driven with the test voltage command as the drive command is within a predetermined range, and determine that a failure has occurred in a phase that is not within the predetermined range, because of which the failed current detecting unit 7 can be identified accurately.

Furthermore, in the sixth embodiment, the timing at which the output of the current detecting unit 7 is acquired does not depend on the on-state or the off-state of the switching elements T1 to T6 of the upper and lower arms 9a and 9b, because of which the process of detecting the current of each phase shown in step S6 of FIG. 2 can be carried out more simply than in the first embodiment. Also, the only difference from the first embodiment being the current detection timing, exactly the same portions can be utilized as portions relating to the failed phase identifying unit 14. Consequently, the same advantages as in the first embodiment are obtained.

Seventh Embodiment

Next, the electric motor control device according to a seventh embodiment of the invention will be described. This embodiment is such that there is a change to the starting condition of the current detecting unit 7 failed phase identifying process shown in step S1 in FIG. 2, described in the first embodiment.

In the first embodiment, the failed phase identifying process of step S3 is started when the abnormality detecting unit 11 detects an abnormality of the current detecting unit 7 in a state in which the inverter circuit 6 is being driven with the voltage command value output by the current control unit 5 as the drive command of the electric motor 1, but the failed phase identifying process can also be started at a point at which the electric motor control device starts up.

Figure 12:
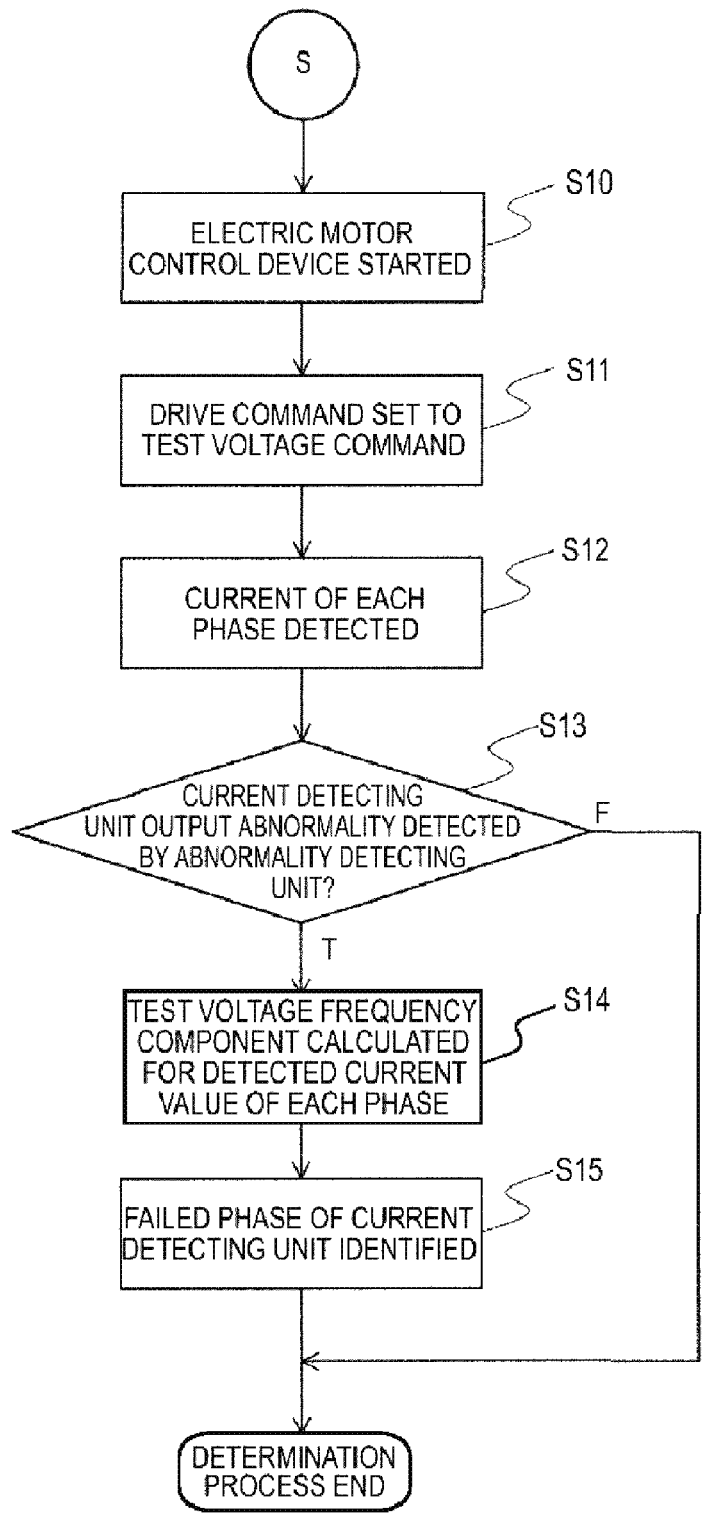
FIG. 12 is a flowchart of the failed phase identifying process of the electric motor control device according to a seventh embodiment of the invention.

In the seventh embodiment, the operation shifts to step S11, in which the test voltage command is set to the drive command of the inverter circuit 6, at the point at which the electric motor control device starts up, as shown in step S10 of FIG. 12.

Next, the detected current value of the current detecting unit 7 in each phase is acquired in step S12, and when the abnormality detecting unit 11 has detected an abnormality of the current detecting unit 7 in step S13, the operation shifts to the current detecting unit 7 failed phase identifying process of step S14. Also, when it is determined in step S13 that the current detecting unit 7 is not abnormal, the determination process is ended, and the drive command of the inverter circuit 6 is switched to the voltage command value output by the current control unit 5.

By the failed phase identifying process being implemented before the inverter circuit 6 is driven by the voltage command value output by the current control unit 5, as in the seventh embodiment, the electric motor 1 can be driven using the detected values of current flowing to normal phases other than the failed phase, without the electric motor 1 exhibiting abnormal behavior due to the detected current value of the failed current detecting unit 7.

Heretofore, the electric motor control device according to the first to seventh embodiments of the invention has been described, but the embodiments can be freely combined, and each embodiment can be modified or abbreviated as appropriate, without departing from the scope of the invention.

The invention claimed is:

1. An electric motor control device including a controller that controls a multi-phase winding electric motor, the controller including an inverter circuit that supplies power to the electric motor, a current controller that outputs a voltage command value as a drive command of the inverter circuit, a current detector that detects current flowing to each phase of the electric motor, and a failed phase identifier that identifies a location of a failure in the current detector, wherein
   the failed phase identifier has a test voltage command generator, which generates a test voltage command having a frequency higher than a rotational frequency of the electric motor, determines whether or not a magnitude or a phase of a frequency component of the test voltage command included in a detected current value when the inverter circuit is driven with the test voltage command as a drive command is within a predetermined range, and determines that a failure has occurred in a phase that is not within the predetermined range.

2. The electric motor control device according to claim 1, wherein
   the controller includes an abnormality detector that detects that an abnormality has occurred in the electric motor, the inverter circuit, or the current detector, drives the inverter circuit with the voltage command output from the current controller as the drive command when the abnormality detector is not detecting an abnormality, and drives the inverter circuit with a test voltage command generated by the test voltage command generator as the drive command when the abnormality detector detects an abnormality, and
   the failed phase identifier starts an identification of a failed phase when the abnormality detector detects an abnormality.

3. The electric motor control device according to claim 2, wherein the failed phase identifier computes a sum total of detected current values of each phase, determines whether or not the sum total is smaller than a threshold value, and determines that the current detector has failed when an absolute value of the sum of the detected current values of three phases is smaller than the threshold value.

4. The electric motor control device according to claim 2, wherein the failed phase identifier includes induced current determination means that determines whether or not current flowing due to an induced voltage of the electric motor is equal to or less than a threshold value, and determines that a failure of the current detector has occurred when determining that the current flowing due to the induced voltage is equal to or less than the threshold value.

5. The electric motor control device according to claim 4, wherein the induced current determination means determines whether or not the current flowing due to the induced voltage of the electric motor is equal to or less than the threshold value based on a rotational speed of the electric motor.

6. The electric motor control device according to claim 2, wherein the inverter circuit includes switching elements in upper and lower arms corresponding to each phase of the electric motor, and includes the current detector connected in series with the switching elements of the lower arm in each phase, and the failed phase identifier computes the magnitude or the phase of the frequency component of the test voltage command based on the current of each phase detected when all of the switching elements of the lower arm are in an on-state.

7. The electric motor control device according to claim 6, wherein the failed phase identifier distinguishes between a failure of the switching elements provided in the upper and lower arms and a failure of the current detector based on the current of each phase detected when all of the switching elements of the lower arm are in an off-state.

8. The electric motor control device according to claim 2, wherein the inverter circuit includes switching elements in upper and lower arms corresponding to each phase of the electric motor, and includes the current detector connected in series with the switching elements of the lower arm in each phase, and the failed phase identifier distinguishes between a failure of the switching elements provided in the upper and lower arms and a failure of the current detector based on the current of each phase detected when all of the switching elements of the lower arm are in an off-state.

9. The electric motor control device according to claim 1, wherein the failed phase identifier computes a sum total of detected current values of each phase, determines whether or not the sum total is smaller than a threshold value, and determines that the current detector has failed when an absolute value of the sum of the detected current values of three phases is smaller than the threshold value.

10. The electric motor control device according to claim 1, wherein the failed phase identifier includes induced current determination means that determines whether or not current flowing due to an induced voltage of the electric motor is equal to or less than a threshold value, and determines that a failure of the current detector has occurred when determining that the current flowing due to the induced voltage is equal to or less than the threshold value.

11. The electric motor control device according to claim 10, wherein the induced current determination means determines whether or not the current flowing due to the induced voltage of the electric motor is equal to or less than the threshold value based on a rotational speed of the electric motor.

12. The electric motor control device according to claim 1, wherein the inverter circuit includes switching elements in upper and lower arms corresponding to each phase of the electric motor, and includes the current detector connected in series with the switching elements of the lower arm in each phase, and the failed phase identifier computes the magnitude or the phase of the frequency component of the test voltage command based on the current of each phase detected when all of the switching elements of the lower arm are in an on-state.

13. The electric motor control device according to claim 12, wherein the failed phase identifier distinguishes between a failure of the switching elements provided in the upper and lower arms and a failure of the current detector based on the current of each phase detected when all of the switching elements of the lower arm are in an off-state.

14. The electric motor control device according to claim 1, wherein the inverter circuit includes switching elements in upper and lower arms corresponding to each phase of the electric motor, and includes the current detector connected in series with the switching elements of the lower arm in each phase, and the failed phase identifier distinguishes between a failure of the switching elements provided in the upper and lower arms and a failure of the current detector based on the current of each phase detected when all of the switching elements of the lower arm are in an off-state.

* * * * *